(12) United States Patent
Ren

(10) Patent No.: US 7,590,878 B2
(45) Date of Patent: Sep. 15, 2009

(54) CIRCUIT AND METHOD FOR PROTECTING MOTHERBOARD

(75) Inventor: Ze-Shu Ren, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 318 days.

(21) Appl. No.: 11/748,506

(22) Filed: May 15, 2007

(65) Prior Publication Data

US 2008/0151455 A1  Jun. 26, 2008

(30) Foreign Application Priority Data

Dec. 22, 2006 (CN) .................. 2006 2 0016700

(51) Int. Cl.
*G06F 1/00* (2006.01)
*G06F 11/30* (2006.01)

(52) U.S. Cl. ................ 713/340; 713/300; 713/310

(58) Field of Classification Search .............. None
See application file for complete search history.

(56) References Cited

U.S. PATENT DOCUMENTS

| 6,970,338 B2 * | 11/2005 | Ju .................. 361/58 |
| 7,493,507 B2 * | 2/2009 | Ren et al. .......... 713/340 |
| 2005/0114716 A1 * | 5/2005 | O .................. 713/300 |

* cited by examiner

*Primary Examiner*—Albert W Paladini
*Assistant Examiner*—Dharti Patel
(74) *Attorney, Agent, or Firm*—Frank R. Niranjan

(57) ABSTRACT

A circuit for protecting a motherboard includes a first transistor (Q1), a second transistor (Q2), a third transistor (Q3), and a power control circuit (200). The power control circuit includes a power controller (10), and a power supply (20), and a fourth transistor (Q4) connected therebetween. The first transistor is supplied with a CPU power signal on the motherboard. The second and third transistors are jointly supplied with a sleep signal and turned on if the CPU power signal is at low level after the power supply is turned on, thereby turning off the fourth transistor and grounding a PWRBTN# pin of the power controller to turn off the power supply for protecting the motherboard from damage due to no CPU power-on voltage applied thereto after the power supply is turned on.

14 Claims, 4 Drawing Sheets

CIRCUIT AND METHOD FOR PROTECTING MOTHERBOARD

BACKGROUND OF THE INVENTION

1. Field of the Invention

The present invention relates to circuits and methods for protecting motherboards, and more particularly to a circuit and a method for protecting a motherboard of which a CPU power header is disconnected from a power supply thereof.

2. Description of Related Art

A conventional computer generally includes an ATX power supply with a 20-pin main power connector, and a 4-pin power connector both of which connect to a motherboard thereof. The 4-pin power connector provides a +12V working voltage to a CPU of the motherboard after the power supply is turned on. If an operator carelessly leaves the 4-pin power connector disconnected from a CPU power header on the motherboard when the computer is assembled, the CPU of the motherboard will not be able to run after the computer is turned on. The motherboard and/or its components may be damaged due to this unintentional disconnection.

In order to protect the motherboard from damage due to the unintentional disconnection, a protection circuit is provided as shown in FIG. 1. The circuit includes a first transistor Q1, a second transistor Q2, and a third transistor Q3. A base of the first transistor Q1 receives a CPU power signal, and an emitter is connected to ground. A base of the second transistor Q2 is connected to a collector of the first transistor Q1, an emitter is connected to ground, and a collector is configured to receive a PWRBTN# signal which is at high level after the computer is on or off and goes low to switch the computer off or on. An emitter of the third transistor Q3 is connected to the collector of the first transistor Q1, a base receives a PWROK signal, which switches from low to high level after the computer is turned on, and a collector is supplied with a +5V voltage source after the computer is turned on. When the computer is turned on without there being a connection with a CPU power connector of a power supply thereof, the first transistor Q1 is closed. The second and third transistors are turned on due to a high level PWROK signal to ground the PWRBTN# signal for switching off the computer and protect the motherboard from damage due to abnormal CPU power-on voltage applied thereto.

However, the PWRBTN# signal switches off the computer via a power controller which directly turns off the power supply of the computer after a 4 second delay when the PWRBTN# signal is grounded and goes from high to low level if no power-on voltage for CPU is provided. Therefore, the motherboard is still at risk during that delay time.

What is needed, therefore, is a circuit to power off the computer more quickly when the computer is turned on without normal CPU power to a motherboard thereof.

SUMMARY OF THE INVENTION

A circuit for protecting a motherboard includes a first transistor, a second transistor, a third transistor, and a power control circuit. The power control circuit includes a power controller and a power supply, with a fourth transistor connected therebetween. The first transistor is supplied with a CPU power signal on the motherboard. The second and third transistors are jointly supplied with a sleep signal and turned on if the CPU power signal is at low level after the power supply is turned on, thereby turning off the fourth transistor and grounding a PWRBTN# pin of the power controller to turn off the power supply for protecting the motherboard from damage due to no CPU power-on voltage applied thereto after the power supply is turned on.

Other advantages and novel features will be drawn from the following detailed description of preferred embodiments with attached drawings, in which:

BRIEF DESCRIPTION OF THE DRAWINGS

FIG. 3 is a time diagram of signals of the circuit shown in FIG. 2 when CPU power is normally applied after the power supply is turned on; and FIG. 4 is a time diagram of signals of the circuit shown in FIG. 2 when no CPU power is applied after the power supply is turned on.

DETAILED DESCRIPTION OF THE INVENTION

Figure 1:
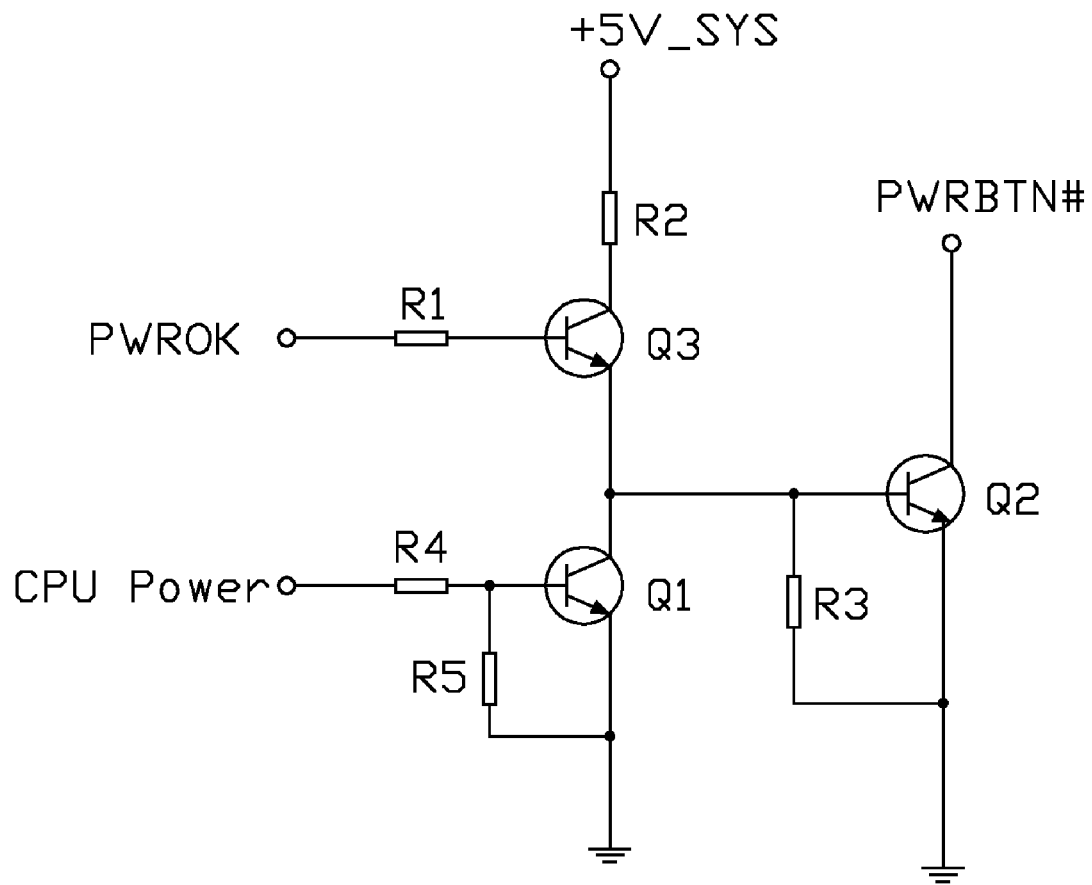
FIG. 1 is a conventional protection circuit for powering off a turned-on computer when there is no CPU power to its motherboard.
Figure 2:
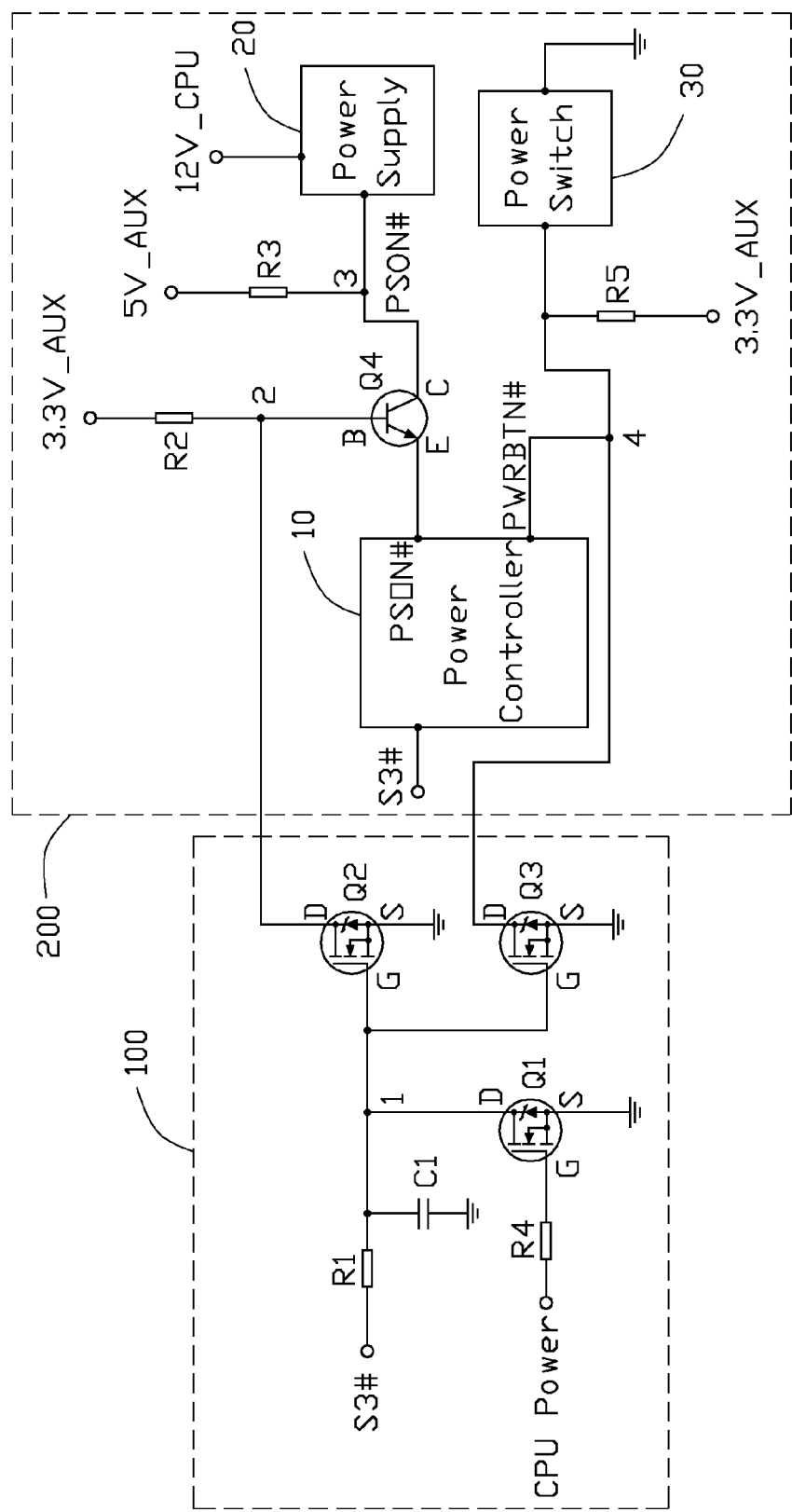
FIG. 2 is a circuit for powering off a turned-on power supply of a computer when CPU power is not applied in accordance with a preferred embodiment of the present invention.

Referring to FIG. 2, a circuit for protecting a motherboard in accordance with a preferred embodiment of the present invention includes a protection circuit 100, and a power control circuit 200. The protection circuit 100 includes transistors Q1, Q2, and Q3. The power control circuit 200 includes a power controller 10, a power supply 20 for a computer, a power switch 30, which may be attached to a front panel of the computer, and a transistor Q4. The power supply 20 has a PSON# terminal and a 12V_CPU output which should be applied to a CPU power header on a motherboard of the computer. The power supply 20 is turned on if its PSON# terminal is at low level and turned off if its PSON# terminal is at high level. The power controller 10 has a PWRBTN# pin, a PSON# pin, and an S3# pin for delivering a sleep signal.

Nodes 1, 2, 3, and 4 are designated in the circuit for facilitating a description of connections of components of the circuit. Node 1 connects to the S3# pin of the power controller 10 via a RC delay circuit which includes a resistor R1 and a capacitor C1. The transistor Q1 has a gate supplied with a CPU power signal on the motherboard via a resistor R4, and a drain connected with the node 1. The transistor Q2 has a gate connected with the node 1, and a drain connected with the node 2. The transistor Q3 has a gate connected with the node 1, and a drain connected with the node 4 which connects with the PWRBTN# pin of the power controller 10. Sources of the transistors Q1, Q2, and Q3 all connect to ground.

The transistor Q4 has a base electrode connected to the node 2 which further connects to a 3.3V_AUX standby voltage source via a resistor R2, an emitter electrode connected with the PSON# pin of the power controller 10, and a collector electrode connected with the node 3 which is supplied with a 5V_AUX standby voltage source via a resistor R3 and connected with the PSON# terminal of the power supply 20.

The power switch 30 has one end connected with the node 4 which is further connected to the 3.3V_AUX standby voltage source via a resistor R5, and another end connected to ground.

Figure 3:
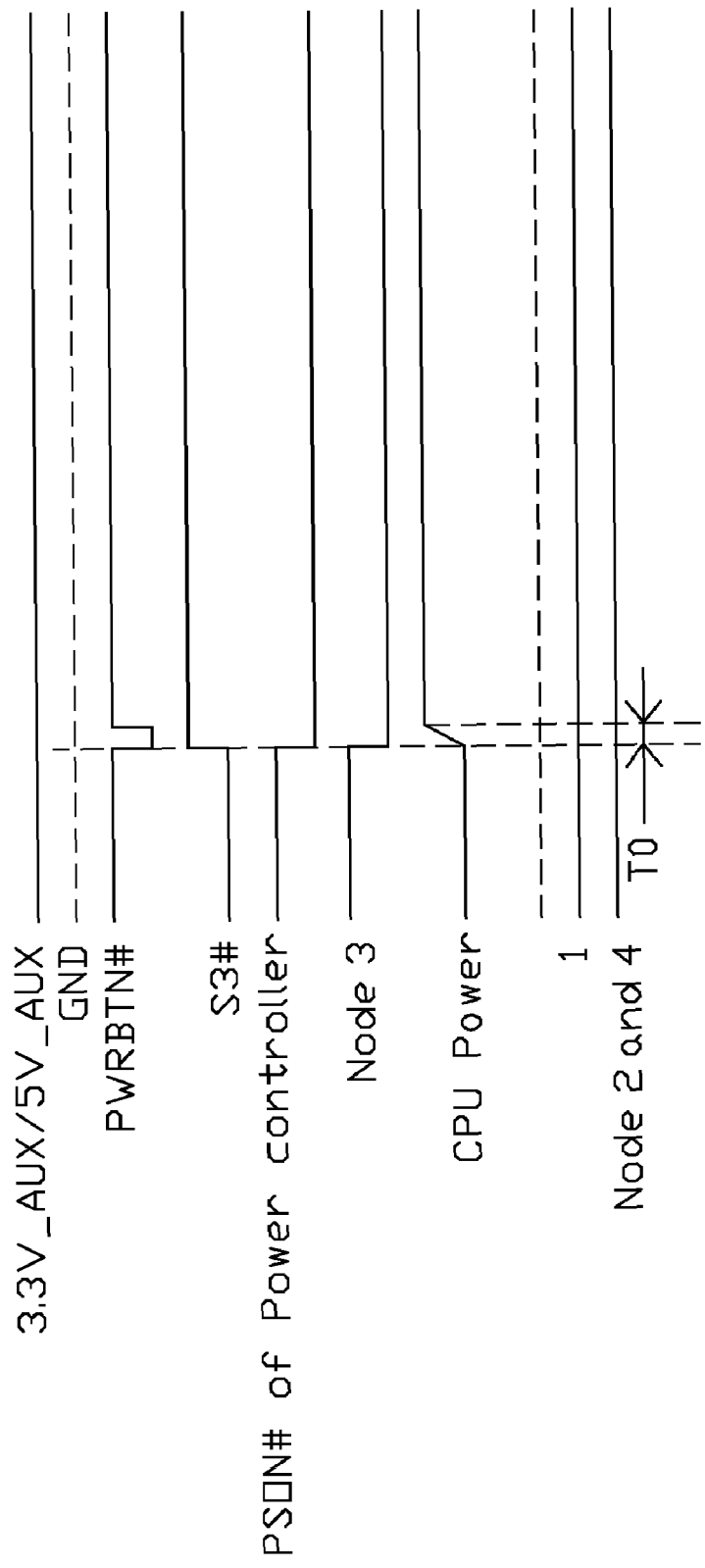

Referring to FIGS. 2 and 3, when the power switch 30 is pressed and then released for powering on the computer, the PWRBTN# pin of the power controller 10 switches from high to low level and then returns to high level. The PSON# pin of the power controller 10 goes to low level at the time the S3# signal goes from low to high level. If the 12V_CPU output of the power supply 20 is normally supplied to the motherboard, the transistor Q1 is turned on. Thus the node 1 is grounded via the conductive transistor Q1 and at low level, and the transistors Q2 and Q3 are both off so that their sources are not conductive with the nodes 2 and 4 respectively. Therefore, the protection circuit 100 is not connected to the power control circuit 200. The transistor Q4 is turned on, thus the PSON# terminal of the power supply 20 goes from high to low level as the PSON# pin of the power controller 10 for turning on the power supply 20. The power supply 20 remains turned on before the power switch 30 is pressed again for powering off the power supply 20.

As shown in FIG. 3, there is a power-on delay time T0 for the CPU power signal going from low to high level. The node 1 does not receive the high level S3# signal when the CPU power signal is powering on and the transistor Q1 is not turned on yet due to a delay time of the RC delay circuit which is no less than the power-on time T0 in order not to incorrectly power off the power supply 20 before the CPU power signal is fully powered up.

Figure 4:
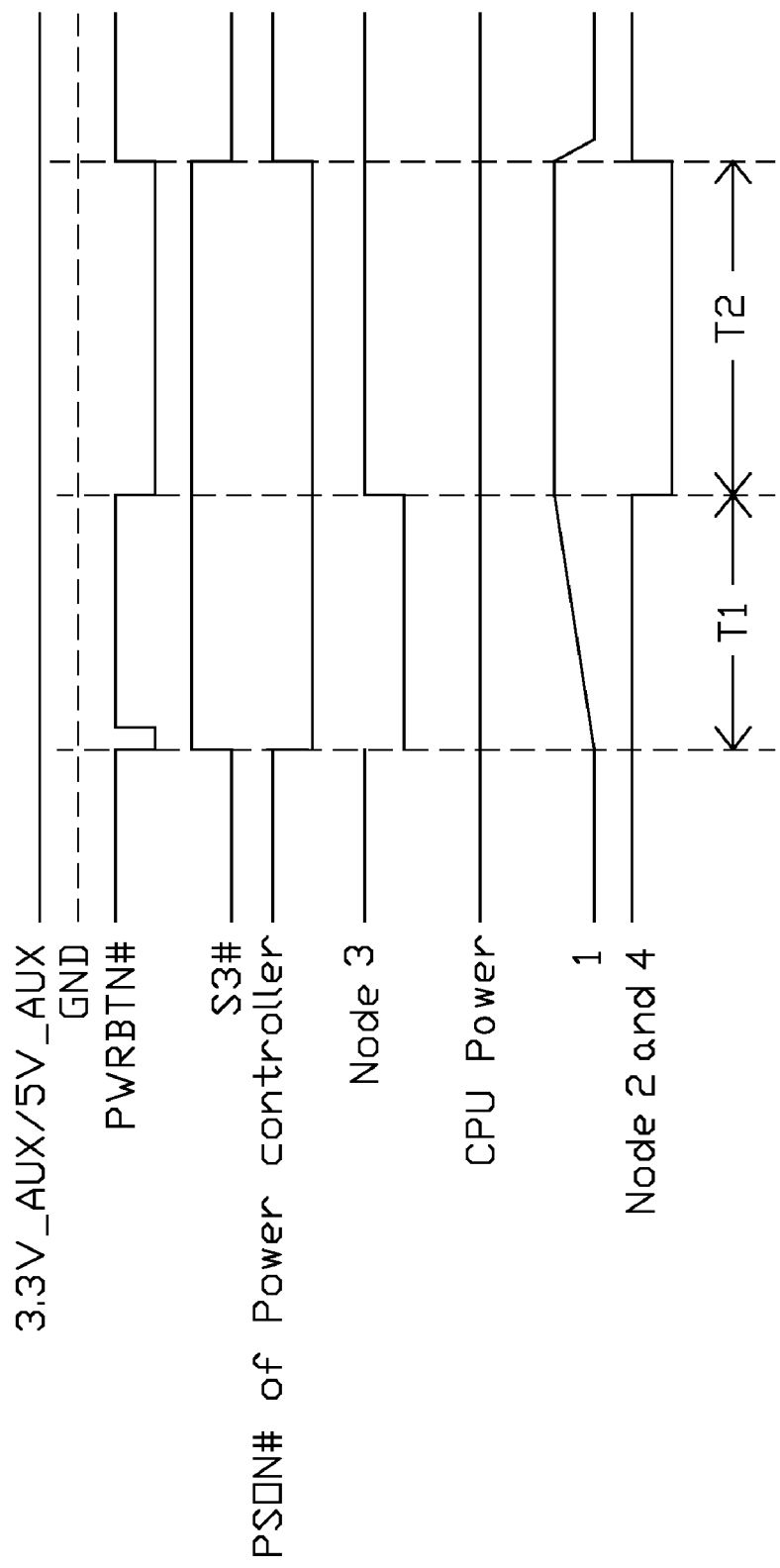

Referring to FIGS. 2 and 4, if the CPU power signal is at low level due to no CPU power is applied to the motherboard from the power supply 20 after powering on the power supply 20, the transistor Q1 is turned off. The node 1 reaches high level after the delay time designated with T1 of the RC delay circuit when the S3# signal goes from low to high level. Thus the transistors Q2, Q3 are turned on grounding the nodes 2 and 4. The transistor Q4 is turned off to disconnect the node 3 from the PSON# pin of the power controller 10, thus the PSON# terminal of the power supply 20 turns to high level to turn off the power supply 20. The S3# signal stays at high level during a delay time T2 after the PWRBTN# pin connected with the node 4 goes from high to low level, and goes from high to low level after the delay time T2, thus the transistors Q2, Q3 are turned off and disconnect their sources from the nodes 2 and 4. The transistor Q4 is turned on. The PSON# pin of the power controller 10 is set from low to high level synchronously and inversely relative to the S3# signal, thus the PSON# terminal of the power supply 20 remains at high level for keeping the power supply 20 turned off and reliably protecting the motherboard from damage due to no CPU power applied thereto.

A range of the delay time T1 of the delay circuit is 100 ms (milliseconds) to 500 ms. Thus a time the power supply 20 is at a power-on state is no more than 500 ms if the CPU power header is unplugged. Therefore, there is less risk to the motherboard. The delay time T2 is about 4 seconds according to a specification of the power controller 10 in a condition that the motherboard is not normally turned on.

As shown in FIG. 2, the transistors Q1, Q2, Q3 are N-channel-enhancement MOSEFTs, and the transistor Q4 is a bipolar N-channel transistor; however other switching devices, such as P-channel MOSEFTs or P-channel bipolar transistors could be employed.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for protecting a motherboard, comprising:
    switching on a power supply for powering the motherboard; and
    enabling a protection circuit to turn off the power supply automatically after a delay time of a delay circuit if a low level CPU power signal is applied to the motherboard after the power supply is switched on, thereby protecting the motherboard from damage due to no CPU power-on voltage supplied thereto; or
    disabling the protection circuit if a high level CPU power signal is applied to the motherboard after the power supply is switched on;
    wherein the delay time is not less than a power-on delay time of the high level CPU power signal in order not to incorrectly enable the protection circuit before the CPU power signal is fully pulled up to the high level after the power supply is switched on.

2. The method as described in claim 1, wherein enabling the protection circuit comprises providing a sleep signal to a first input terminal of the protection circuit to turn off a switch connected between the power supply and a power controller, and ground a PWRBTN# pin of the power controller, thereby turning off the power supply which has a PSON# terminal connected to a standby voltage source.

3. The method as described in claim 2, wherein the sleep signal is set to high level by the power controller when the power supply is switched on, and set from high to low level after the power supply is turned off.

4. The method as described in claim 3, further comprising disabling the protection circuit after the sleep signal is set to low level; wherein at a time when the sleep signal is set from high to low level, a PSON# pin of the power controller connected to the PSON# terminal of the power supply is set from low to high level for maintaining the PSON# terminal of the power supply at high level to keep the power supply turned off.

5. The method as described in claim 3, wherein disabling the protection circuit comprises providing the sleep signal to the first input terminal of the protection circuit, and providing the high level CPU power signal to a second input terminal of the protection circuit.

6. The method as described in claim 5, wherein disabling the protection circuit further comprises turning on a first transistor to ground the sleep signal via its ground terminal, thereby disabling the protection circuit; wherein the first transistor is turned on when the CPU power signal is at high level, and turned off when the CPU power signal is at low level.

7. The method as described in claim 1, wherein the delay time of the delay circuit is less than 500 milliseconds.

8. A circuit for protecting a motherboard timely, comprising:
    a first transistor with a gate supplied with a CPU power signal on the motherboard, a drain supplied with a sleep signal, and a source connected to ground;
    a second transistor with a gate connected with the drain of the first transistor, a drain connected to a first standby voltage source, and a source connected to ground;
    a power control circuit comprising a power supply with a PSON# terminal connected to a second standby voltage source, a power controller, and a switch component; the PSON# terminal of the power supply further connecting to a PSON# pin of the power controller via the switch component of which one electrode is connected with the drain of the second transistor; and
    a third transistor with a gate connected with the drain of the first transistor, a drain connected with a PWRBTN# pin of the power controller, a source connected to ground;
    wherein the CPU power signal is at low level and the sleep signal is set from low to high level after the power supply is turned on but no CPU power-on voltage is supplied to the motherboard, the first transistor is turned off, the second and third transistors are turned on to ground said one electrode of the switch component and the PWRBTN# pin, thereby turning off the switch component to disconnect the power supply from the power controller, and power off the power supply consequently for protecting the motherboard from damage due to no CPU power-on voltage supplied thereto.

9. The circuit as described in claim 8, wherein after the PWRBTN# pin is set from high to low level by the third transistor, the PSON# pin of the power controller is set from low to high level not later than the sleep signal turns from high to low level, thereby keeping the power supply off.

10. The circuit as described in claim 9, wherein if the CPU power signal is at high level after the power supply is turned on, the first transistor is turned on to ground the sleep signal, and the second and third transistors are turned off to disconnect their ground terminals from the switch component and the PWRBTN# pin of the power controller respectively, thereby keeping the power supply turned on normally.

11. The circuit as described in claim 10, wherein the sleep signal is applied to the drain of the first transistor, the gates of the second and the third transistors via a delay circuit of which a delay time is longer than a normal power-on delay time of a CPU power output from the power supply.

12. The circuit as described in claim 8, wherein the first, second, and third transistors are all N-channel-enhancement MOSFETs.

13. The circuit as described in claim 8, wherein the switch component of the power control circuit is an N-channel bipolar transistor of which a base electrode is connected with the drain of the second transistor, an emitter electrode is connected with the PSON# pin of the power controller, and a collector electrode is connected with the PSON# terminal of the power supply; wherein the power supply is turned on when the PSON# terminal thereof is at low level and turned off when the PSON# terminal thereof is at high level.

14. The circuit as described in claim 8, wherein the power control circuit further comprises a power switch connected to the PWRBTN# pin of the power controller, when the power switch is pressed and then released for turning on the power supply, the PWRBTN# pin switches from high to low level and then returns to high level.

* * * * *